United States Patent [19]

Sekella

[11] Patent Number: 4,606,444
[45] Date of Patent: Aug. 19, 1986

[54] SPRING OPERATED CLUTCH

[75] Inventor: Thomas C. Sekella, Elmira, N.Y.

[73] Assignee: Facet Enterprises, Inc., Tulsa, Okla.

[21] Appl. No.: 519,967

[22] Filed: Aug. 3, 1983

[51] Int. Cl.$^4$ .................. F16D 59/02; F16D 7/02; F16D 11/00; F16D 27/10

[52] U.S. Cl. .................. 192/48.2; 188/171; 192/48.5; 192/56 R; 192/90; 192/149; 464/43

[58] Field of Search .................. 192/48.2, 48.5, 84 B, 192/90, 18 B, 149, 56 R; 188/171; 464/42, 43

[56] References Cited

U.S. PATENT DOCUMENTS

| 952,535 | 3/1910 | Loomis | 192/48.5 X |
|---|---|---|---|
| 2,969,134 | 1/1961 | Wiedmann et al. | 192/84 B |
| 3,073,180 | 1/1963 | Lohr | 192/48.2 X |
| 3,157,260 | 11/1964 | Straub et al. | 192/84 B |
| 3,172,515 | 3/1965 | Wrensch | 192/90 |
| 3,175,665 | 3/1965 | Albrecht | 192/48.2 X |
| 3,324,981 | 6/1967 | Aschauer | 192/48.2 |
| 3,400,797 | 9/1968 | Horn et al. | 192/90 X |
| 3,414,100 | 12/1968 | Spencer | 192/90 |
| 3,539,043 | 11/1970 | Brochetti | 192/56 R |
| 3,648,483 | 3/1972 | Garcia | 464/43 |
| 3,812,551 | 5/1974 | Mortensen | 464/42 X |

FOREIGN PATENT DOCUMENTS

1048750 1/1959 Fed. Rep. of Germany ........ 464/63

Primary Examiner—Rodney H. Bonck
Attorney, Agent, or Firm—Remy J. VanOphem

[57] ABSTRACT

A spring operated clutch having an input subassembly and an output subassembly. The input subassembly includes a sleeve member fixedly interconnected with an input drive shaft and provided with a double conical resilient frictional member on an outer cylindrical surface thereof. A first brake member is movably disposed within a bore of a second brake member, each of the brake members having frustoconical surfaces cooperating with one of two frustoconical surfaces of the frictional member. An adjusting member is movably interconnected with one of the brake members and a spring is interposed the adjusting member in the first brake member so as to bias the brake members into engagement with the friction member. The output subassembly includes an annular armature member having a first set of teeth extending therefrom and engageable with a second set of teeth which extend from the first brake member. The armature member is movably interconnected with the magnet body which, in turn, is fixedly interconnected with the housing. Springs bias the armature into engagement with the second brake member while an electromagnetic coil in a magnet body is selectively operable to overcome the biasing force of springs to disengage the first and second set of teeth.

29 Claims, 3 Drawing Figures

Fig-1

SPRING OPERATED CLUTCH

FIELD OF THE INVENTION

The present invention is directed to spring operated clutches and more particularly to a tooth type spring engaged brake and clutch with a double cone friction slip coupling.

BACKGROUND OF THE INVENTION

Millions of clutches are in common use today in various devices for the purpose of rapidly stopping the rotation of the drive shaft upon the occurrence of some predetermined event, such as upon the deenergization of the motor driving the shaft.

Many of these clutches have used frictional surfaces which frictionally engage each other to absorb the inertia of the rotating drive shaft. When the absorption of this inertia without undue shock is desired, the frictional type clutch is highly desirable since the frictional clutch will decelerate the shaft without inducing much of a shock load to the shaft.

Commonly used friction type clutches fall into two general categories: disc clutches and cone clutches. Each of these types of brakes has certain disadvantages.

The disc type clutch involves two generally flat frictional surfaces which are moved into and out of engagement by appropriate means. In order to provide a large braking torque, the discs, as well as the associated components, are comparatively large. Accordingly, clutches of the disc type are not often used when a compact, lightweight clutch assembly is needed.

On the other hand, the conical type friction clutch provides a pair of frustoconical mating frictional surfaces which are selectively engaged with each other to absorb the inertia of the drive shaft. While the use of a frustoconical surface increases the frictional torque for this type of device, as compared to a disc clutch, clutches of this type are also somewhat large and heavy if they are to exert sufficient frictional torque on the drive shaft to rapidly decelerate the drive shaft.

Furthermore, it is often difficult in a small, compact, and inexpensive frictional clutch of either of the above described types to fully separate the frictional surfaces, thus resulting in a drag torque between the two frictional surfaces during normal operation of the drive shaft. The drag torque results in an increased power consumption by the drive shaft as well as in a rapid deterioration of the frictional surfaces resulting in the need to replace frictional surfaces more rapidly than would be the case if no drag was experienced during normal operation.

An alternate solution to the above described problem is to provide a clutch first gear having face teeth depending from the drive shaft selectively engageable with a second gear movably interconnected with the clutch housing so as to positively stop the drive shaft upon engagement of the teeth. While this configuration does result in a clutch which positively stops the drive shaft, the engagement of the teeth does result in a torsional shock load in the clutch, which load is transferred to the drive shaft. Clearly, then, all the conponents in the clutch assembly must be made strong enough to withstand a sudden elevated torsional load experienced initially during engagement of the teeth.

It would be useful to provide a lightweight, compact and inexpensive clutch combining the advantages of each of the above types of clutches yet avoiding many of their disadvantages. The desired clutch should impart a minimum torsional shock during the clutch application yet should rapidly decelerate the drive shaft. Finally, the desired clutch should not waste power through a large drag torque during normal operation of the drive shaft.

SUMMARY OF THE INVENTION

The present invention is directed to the problem of providing an inexpensive, compact, and lightweight clutch assembly which provides a minimum shock at clutch application yet rapidly decelerates a drive shaft.

The present invention provides a clutch assembly having an input subassembly, including an input or drive shaft, and an output subassembly. The input subassembly is provided with a frictional brake subassembly having a first braking frictional surface engaging a second brake surface depending from the drive shaft. The brake subassembly is provided with face teeth selectively engageable with face teeth on a gear member which is movably interconnected with the output subassembly. During normal operation, the teeth are not engaged and, accordingly, the brake subassembly rotates together with the input shaft. The clutch is actuated by selective displacement of the gear member to engage the face teeth on the brake subassembly, thereby halting the rotation of the brake subassembly, which in turn decelerates the input shaft through the cooperative action of the braking surfaces.

In particular, and in the preferred embodiment of the present invention, the input shaft is provided with a sleeve member fixedly interconnected for rotation therewith. A double conical frictional member is provided around a peripheral portion of the sleeve member. The double conical frictional member has two sloping frictional surfaces defining therebetween a convex apex. A first brake member is fitted over the double conical friction member and is provided with a first frustoconical surface engaging one of the brake surfaces of the cone member. A second brake member is movably interconnected with the first brake member and is provided with a frustoconical frictional surface engaging the other frictional surface of the cone member. An adjustable biasing member is provided to bias the brake members into engagement with the cone member.

Furthermore, in the preferred embodiment, the ring member consists of a magnetic armature member movably interconnected with a magnet body which, in turn, is interconnected with a housing. Springs bias the armature member towards the face teeth of the brake subassembly. An electromagnetic coil is selectively energizable to overcome the force of the spring to bias the armature member from engagement with the brake subassembly.

The primary object of the present invention is to provide a compact, lightweight, and inexpensive clutch assembly. The present invention provides such a clutch assembly by use of a cone member having two oppositely oriented frustoconical surfaces. This permits a substantial frictional surface, thereby providing a maximum frictional torque in a compact device.

Another object of the present invention is to provide a clutch assembly which offers a minimum drag during normal operation of the drive shaft. The present invention minimizes the drag during normal operation of the drive shaft by positive disengagement of the face teeth from the gear member or armature member during normal operation so that the brake subassembly rotates with the input shaft.

Still another object of the present invention is to provide a clutch assembly having a minimum torsional shock during the brake application. The clutch assembly of the present invention minimizes the shock experienced during the brake application by permitting the shock to be absorbed by frictional brake components rather than merely by the teeth.

Still yet another object of the present invention is to provide a clutch assembly which rapidly decelerates the drive shaft with a minimum shock load, yet is compact and lightweight. The present invention provides such a clutch assembly by use of the double cone member to save space and weight, an adjustable biasing member to provide a predetermined frictional torque between the brake subassembly and the input shaft, and a gear member positively engaging face teeth on the brake assembly so as to positively stop the brake subassembly from rotation when desired.

These and many other objects, features and advantages of the present invention will become apparent to those skilled in the art when the following detailed description of the preferred embodiment is read in conjunction with the drawings which are appended hereto.

DETAILED DESCRIPTION OF THE PREFERRED EMBODIMENT

Referring now to the drawing, the clutch assembly of the present invention is shown by way of an illustration of the preferred embodiment which is described below in detail. In the following detailed description, certain specific terminology will be employed for the sake of clarity and a particular embodiment described in accordance with the requirements of 35 U.S.C. 112, but it is to be understood that the same is not intended to be limiting and that it should not be so construed inasmuch as the invention is capable of taking many forms and variations within the scope of the appended claims.

Figure 1:
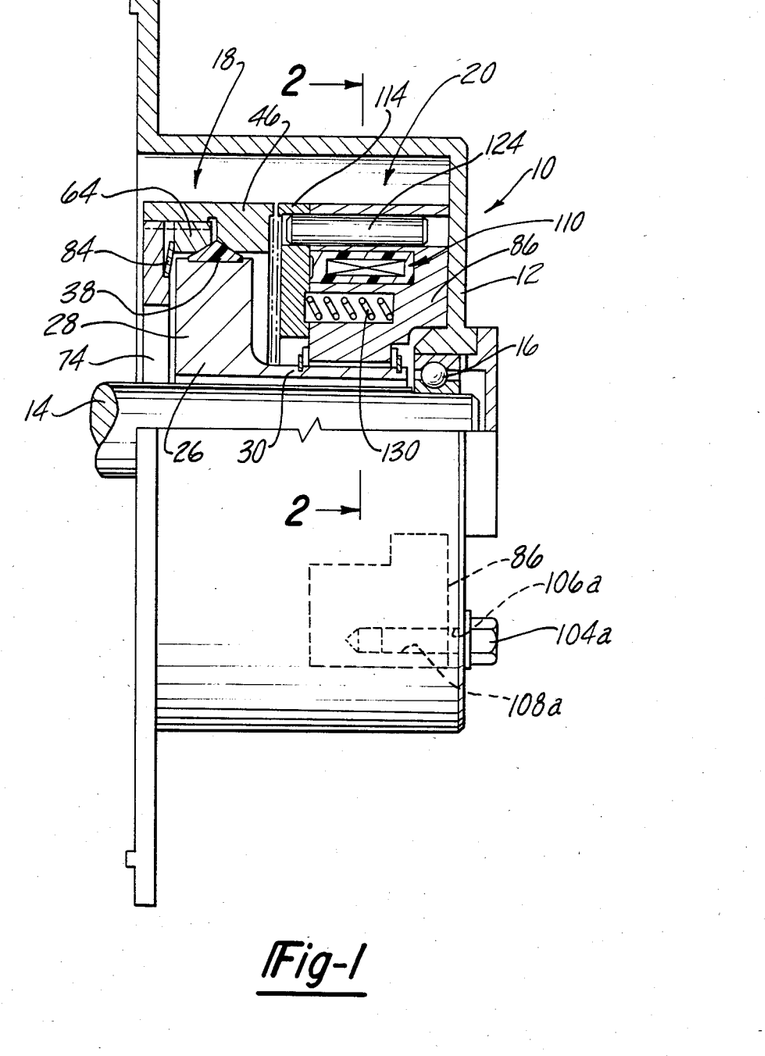
FIG. 1 is an elevational view, partially in section, of a clutch assembly according to the present invention.
Figure 3:
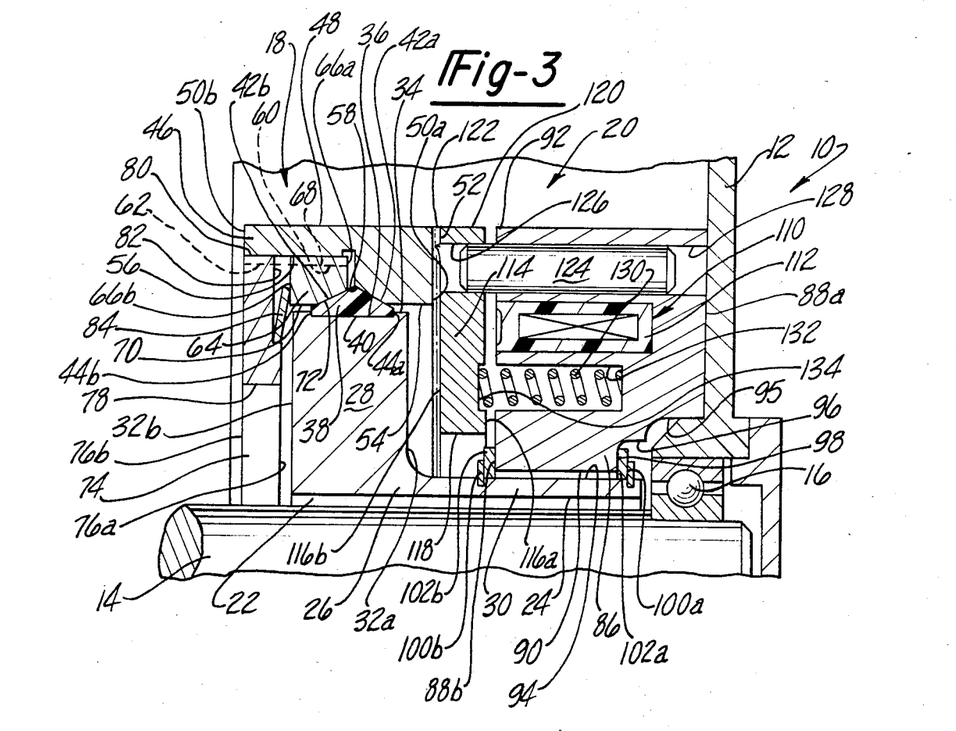
FIG. 3 is a fragmentary sectional view, similar to a portion of FIG. 1 and at an enlarged scale, the armature member engaging face teeth of the ring gear adapter.

As illustrated in FIGS. 1 and 3, the clutch assembly 10 according to the present invention is provided with a housing or cover 12. A rotatable input shaft 14 extends through the housing 12. A bearing 16 is provided between the housing or cover 12 and the input shaft 14 to accommodate the rotation of the input shaft 14.

The clutch assembly 10 is further provided with an input subassembly 18 interconnected with the input shaft 14 for rotation therewith. An output subassembly 20 is also provided and is interconnected with the housing 12. The output subassembly 20 is selectively engageable with the input subassenbly 18 to stop the rotation of the input shaft 14, as will be described later herein.

The input subassembly 18 is best shown in FIG. 3. The input shaft 14 is provided with a radially extending key 22 which is inserted into a keyway 24 of a sleeve member 26 such that the sleeve member 26 will rotate with the input shaft 14. The sleeve member 26 has an enlarged disc shaped portion 28 extending radially from the input shaft 14 and further is provided with an elongated portion 30, described later herein, extending from the enlarged portion 28 towards the forward end of the housing 12.

The enlarged portion 28 of the sleeve member has a forward annular surface 32a and a rearward annular surface 32b as well as an outer cylindrical surface 34 extending therebetween. An annular recess 36 is formed in the outer cylindrical surface 34.

A double inner cone member 38 is fitted in the annular recess 36 of the sleeve member 26. The double inner cone member may be formed of a segmented annular member formed of a resilient material. The double inner cone member 38 is provided with an inner cylindrical surface 40 adjacent the annular recess 36. Furthermore, the double inner cone member is provided with two oppositely oriented frustoconical surfaces, a forward frustoconical surface 42a and rearward frustoconical surface 42b. Each of the frustoconical surfaces 42a and 42b may be provided with a frictional coating. The double inner cone member 38 further has forward and rearward annular surfaces 44a and 44b, respectively, extending downwardly from the forward and rearward frustoconical surfaces 42a and 42b, respectively. Thus, the double inner cone member forms a convex apex between the forward and rearward frustoconical surfaces 42a and 42b.

A ring gear adapter 46 is disposed around the enlarged portion 28 of the sleeve member 26. The ring gear adapter is a generally annular member having forward and rearward annular surfaces 50a and 50b, respectively, and an outer cylindrical surface 48 extending therebetween. Face teeth 52 are formed in the forward annular surface 50a of the ring gear adapter 46. The face teeth 52 are provided for the selective engagement of the input subassembly 18 with the output subassembly 20 in a manner to be described later herein.

The ring gear adapter 46 is further provided with a first inner cylindrical surface 54 defined by a first bore in the ring gear adapter and a second inner cylindrical surface 56 defined by a counterbore in the ring gear adapter. A frustoconical inner surface 58 is provided between the first and second inner cylindrical surfaces 54 and 56. The frustoconical inner surface 58 may be coated with a frictional material, if desired, and selectively engages the forward frustoconical surface 42a of the double inner cone member 38.

The second inner cylindrical surface 56 is provided with a plurality of splines 60 extending therealong and is further provided with threads 62 adjacent the rearward annular surface 50b.

An intermediate cone member 64 is movably fitted in the counterbore of the ring gear adapter 46 and is provided with external splines on its outer surface 68 engaging the splines 60 of the ring gear adapter 46. The intermediate cone member 64 thereby may reciprocate within the counterbore but may not rotate relative to the ring gear adapter 46.

The intermediate cone member 64 is a generally annular member having forward and rearward annular surfaces 66a and 66b, respectively, an outer cylindrical surface 68, described above, and an inner cylindrical surface 70 A frustoconical inner surface 72 is provided between the inner cyqindrical surface 70 and the forward annular surface 66a. The frustoconical inner surface 72 may be provided, as desired, with a frictional coating. The frustoconical inner surface 72 frictionally engages the rearward frustoconical surface 42b of the double inner cone member 38.

An annular adjusting nut 74 is threaded into the counterbore of the ring gear adapter 46. The adjusting nut 74 has forward and rearward annular surfaces 76a and 76b, respectively, an inner cylindrical surface 78 permitting clearance of the adjusting nut 74 from the input shaft 14, and an outer threaded surface 80 engageable with the threads 62 of the ring gear adapter 46. An annular recess 82 is formed in the forward annular surface 76a of the adjusting nut 74. A spring washer 84 is provided in the recess 82 and exerts a force between the adjusting nut 74 and the intermediate cone member 64, such as to bias both the intermediate cone member and the ring gear adapter 46 into frictional engagement with the forward and rearward frustoconical surfaces 42a and 42b of the double inner cone member 38. The adjusting nut 74 may be selectively adjusted so as to provide a predetermined amount of torsional friction between the braking subassembly and the double inner cone member 38, The output subassembly 20, as illustrated in FIGS. 1 through 3 of the drawing, is fixedly interconnected with the housing 12 and rotatably mounted on the elongated portion 30 of the sleeve member 26.

Figure 2:
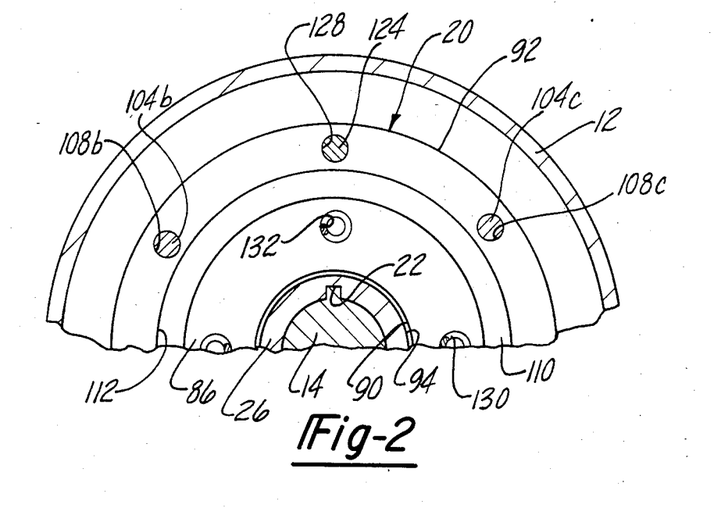
FIG. 2 is a sectional view taken along lines 2—2 of FIG. 1.

The output subassembly 20, as illustrated in FIGS. 1 through 3 of the drawing, includes an annular magnet body 86 having forward and rearward annular surfaces 88a and 88b, respectively, and inner and outer cylindrical surfaces 90 and 92, respectively, extending therebetween. The annular magnet body 86 is fitted onto the elongated portion 30 of the sleeve member 26. The inner cylindrical surface 90 of the magnet body is spaced a predetermined distance away from an outer cylindrical surface 94 of the elongated portion of the sleeve member 26. A bore 95 is provided in the forward annular surface 88a of the annular magnet body 86, if necessary, to provide clearance for the bearings 16. A counterbore 96 is provided aligned with the bore 95 for clearance of a thrust bearing 102a and a C-clip 100a, described below. The base of the counterbore 96 defines a second forward annular surface 98.

The annular magnet body 86 is interconnected with the sleeve member 26 by means of the C-clip 100a in conjunction with another C-clip 100b. The C-clips 100a and 100b are fitted into suitable annular recesses in the outer cylindrical surface 94 of the sleeve member 26. The thrust bearing 102a and another thrust bearing 102b are provided between the C-clips 100a and 100b and the annular surfaces 88b and 98 of the annular magnet body 86, respectively.

The annular magnet body 86 is secured to the housing 12 by means of appropriate bolts 104a, 104b, and 104c, passing, respectively, through suitable apertures 106a, 106b, and 106c (not all shown in the drawing) in the forward portion of the housing 12 and threaded into suitable threaded bores 108a, 108b, and 108c as illustrated in FIGS. 1 and 2.

An electromagnetic coil 110 is fitted in an annular recess 112 in the rearward annular surface 88b of the annular magnet body 86. The electromagnetic coil 110 is interconnected with a suitable source of electric power to permit selective energizing of the coil 110 to create an electromagnetic field. A gear member or annular armature member 114 is movably interconnected with the annular magnet body 86. As illustrated, the annular armature member 114 has forward and rearward annular surfaces 116a and 116b, respectively, and an inner cylindrical surface 118 and an outer cylindrical surface 120 extending therebetween. A plurality of face teeth 122 are provided on the rearward annular surface 116b of the annular armature member 114. The teeth 122 are selectively engageable with the teeth 52 of the ring gear adapter 46.

The annular armature member 114 is movably interconnected with the annular magnet body 86 by means of several pins, 124, only one of which is shown in the drawing. Each pin 124 is fitted in suitable aligned bores 126 and 128, respectively, in the annular armature member 114 and the annular magnet body 86.

Springs 130 provide a biasing force between the annular armature member 114 and the annular magnet body 86 to bias the armature member into engagement with the ring gear adapter 46. Each spring 130 is fitted in a bore 132 in the annular magnet body 86 and extends therefrom into a shallow bore 134 in the annular armature member 114.

The operation of the clutch assembly of the present invention may now be appreciated. During normal operation, the electromagnetic field generated by the electromagnetic coil 110 in the annular magnet body 86 overcomes the force of the springs 130 to prevent engagement of the teeth 122 and teeth 52. Therefore, the brake subassembly consisting of the ring gear adapter 46, the intermediate cone member 64, the adjusting nut 74, and the spring washer 84 rotates freely with the sleeve member 26.

When deceleration of the input shaft 14 is desired, the electromagnetic coil 110 is deenergized, permitting the springs 130 to drive the annular armature member 114 towards the brake subassembly and, engaging the teeth 122 with the teeth 52.

Once the teeth are engaged, the brake subassembly is prevented from rotating relative to the output subassembly 20 and, therefore, the rotational inertia of the input subassembly is absorbed by the frictional surfaces 42a, 42b, 58, and 72.

It should be appreciated that the torsional shock which would otherwise be experienced by the components in the clutch assembly due to the engagement of the teeth is not experienced due to the use of a friction brake as described above. Furthermore, a portion of the shock is absorbed by the resilient material of the double inner cone member.

Furthermore, a substantial amount of frictional torque will be exerted between the brake subassembly and the sleeve member 26 due to the use of two frustoconical surfaces for braking.

The above constitutes a detailed description of the best mode contemplated by the inventor for carrying out the present invention at the time of filing. It will be appreciated by one skilled in the art that variations or modifications may be made from the structure described above within the scope of the appended claims.

What is claimed as novel is as follows:

1. A spring operated clutch comprising:
    input means having an input shaft; a sleeve secured to said input shaft for rotation therewith; and at least a first frictional surface attached to said sleeve;
    friction brake means mounted to said sleeve, said friction brake means having at least a second frictional surface disposed adjacent said first frictional surface;
    first biasing means biasing said second frictional surface of said friction brake means and said first frictional surface of said input means into engagement such that a predetermined torque is required to rotate said friction brake means relative to said input means;

a first plurality of teeth extending from said friction brake means;

output means;

gear means movably interconnected to said output means, such as to be selectively movable towards and away from said friction brake means;

a second plurality of teeth extending from said gear means towards said first plurality of teeth and selectively engageable therewith when said gear means is selectively moved towards said friction brake means;

second biasing means biasing said gear means towards said friction brake means and, thereby, biasing said second plurality of teeth into engagement with said first plurality of teeth; and electromagnetic biasing means selectively operable to bias said gear means away from said friction brake means, said electromagnetic biasing means overcoming the force of said second biasing means when selectively operated.

2. The spring operated clutch of claim 1 wherein said first frictional surface comprises a frustoconical surface on said sleeve and further wherein said friction second frictional surface comprises a frustoconical surface on said friction brake means.

3. The spring operated clutch of claim 1 wherein said first frictional surface comprises two oppositely oriented frustoconical surfaces defining an apex therebetween, said friction brake means comprising a frictional surface engaging at least one of said frustoconical surfaces.

4. The spring operated clutch of claim 3 wherein said input means comprises:

an annular recess;

a resilient two-piece double conical brake member disposed in said annular recess, said brake member having said two oppositely oriented frustoconical surfaces extending therefrom; and said sleeve extending radially to define an outer cylindrical surface.

5. The spring operated clutch of claim 3 wherein said friction brake means further comprises:

first means having a frustoconical surface adjacent to and coacting with one of said frustoconical surfaces of said input means;

second means movable relative to said first means and having another frustoconical surface adjacent to and coacting with the other frustoconical surface of said input means; and biasing means interposed said first and second means to bias said first and second means together.

6. The spring operated clutch of claim 5 wherein said friction brake means further comprises adjustment means for adjusting the biasing force of said first biasing means.

7. The spring operated clutch of claim 5 wherein one of said first means of said friction brake means and said second means of said friction brake means is a generally annular member, said generally annular member having at least a partial bore therein, and wherein the other of said first means of said friction brake means and said second means of said friction brake means is movably disposed in said at least a partial bore.

8. The spring operated clutch of claim 7 wherein said generally annular member further comprises splines extending from said partial bore and wherein said other of said first means of said friction brake means and said second means of said friction brake means comprises external splines cooperating with said first mentioned splines such as to reciprocably interconnect said first means of said friction brake member and said second means of said friction brake member.

9. The spring operated clutch of claim 1 wherein said gear means comprises an annular member movably disposed about said input shaft.

10. The spring operated clutch of claim 9 wherein said electromagnetic biasing means comprises an annular magnet body rotatably disposed along said sleeve, and wherein said gear means comprises a magnetic armature reciprocably interconnected with said annular magnet body to move relative thereto along said sleeve.

11. The spring operated clutch of claim 10 wherein said annular magnet body is secured in position along said input shaft by a pair of C-clips.

12. The spring operated clutch of claim 11 further comprising thrust bearings interposed said C-clips and said annular magnet body.

13. The spring operated clutch of claim 1 wherein said input means further comprises a resilient frustoconical member mounted thereto, said first frictional surface comprising a frustoconical surface of said frustoconical member.

14. The spring operated clutch of claim 1 wherein said gear means is a magnetic member.

15. The spring operated clutch of claim 14 wherein said electromagnetic biasing means comprises a magnet body fixedly interconnected with said output means and wherein said gear means comprises an annular armature member reciprocably interconnected with said magnet body for selective reciprocation towards and away from said friction brake means to selectively engage and disengage said first and second pluralities of teeth.

16. The spring operated clutch of claim 15 wherein said second biasing means comprises a spring interposed said magnet body and said annular armature member.

17. A spring operated clutch comprising:

input means comprising an input shaft; a sleeve member fixedly interconnected with said input shaft for rotation therewith and a frustoconical member interconnected with said sleeve member;

a first frustoconical surface on said frustoconical member;

friction brake means movably mounted to said input means;

a second frustoconical surface on said friction brake means and adjacent said first frustoconical surface for engagement therewith;

first biasing means biasing said fricition brake means into engagement with said input means so as to bias said first and second frustoconical surfaces into engagement;

a first plurality of teeth extending from said friction brake means;

output means;

gear means movably interconnected to said output means, such as to be selectively movable towards and away from said friction brake means;

a second plurality of teeth extending from said gear means towards said first plurality of teeth and selectively engageable therewith when said gear means is selectively moved towards said friction brake means;

second biasing means biasing said gear means towards said friction brake means and, thereby, biasing said teeth into engagement; and electromagnetic biasing means selectively operable to bias said gear means away from said friction brake means, said electromagnetic biasing means overcoming the force of said second biasing means when operated.

18. The spring operated clutch of claim 17 wherein said input means has two of said first frustoconical surfaces, each of said frustoconical surfaces being oppositely disposed, such as to form a convex apex therebetween; and further, wherein said first biasing means comprises one of said two brake members having a bore, two brake members, each of said brake members having one frustoconical surface engageable with one of said frustoconical surfaces of said input means; and further wherein said first biasing means biases said two brake members towards each other so as to bias both of said frustoconical surfaces of said two brake members against a frustoconical surface of said input means.

19. The spring operated clutch of claim 18 further comprising adjustment means for adjusting said first biasing means such as to adjust the torque required to rotate said friction brake means relative to said input means.

20. The spring operated clutch of claim 18 further comprising an adjusting member threadingly interconnected with one of said first brake member and said second brake member, said first biasing means comprising a spring interposed said adjusting member and one of said first brake member and said second brake member so as to bias said one of said first brake member and said second brake member away from said adjusting member and, thereby, to bias said frictional surface into engagement with said input means.

21. The spring operated clutch of claim 18 wherein said electromagnetic biasing means further comprises a magnet body rotatably connected with said sleeve member.

22. The spring operated clutch of claim 21 wherein said gear means comprises an annular armature member movably interconnected with said magnet body and movably disposed about said sleeve member so as to be movable towards and away from said friction brake means.

23. A spring operated clutch comprising:
input means;
a first frustoconical surface on said input means;
a second frustoconical surface on said input means, said second frustoconical surface being disposed adjacent to and facing away from said first frustoconical surface such that, together, said first and second frustoconical surfaces define a convex apex;
a first brake member disposed about said input means;
a third frustoconical surface on said first brake member and adjacent said first frustoconical surface for engagement therewith;
a second brake member movable interconnected with said first brake member;
a fourth frustoconical surface on said second brake member and adjacent said second frustoconical surface of said input means for engagement therewith;
biasing means biasing said first and second brake members such as to bias said third and fourth frustoconical surfaces towards each other into engagement with said first and second frustoconical surfaces, respectively,
a first plurality of teeth extending from said first brake member;
output means;
an electromagnetic body rigidly fixedly interconnected with said outout means and selectively operable to generate a magnetic field;
annular armature means movably interconnected with said electromagnetic body such as to be reciprocable relative thereto towards and away from said first brake member;
a second plurality of teeth extending from said annular armature means engageable with said first plurality of teeth; and
second biasing means interposed said annular armature means in said electromagnetic body and biasing said annular armature means towards said first brake member, said annular armature means being selectively driveable against the force of said second biasing means away from said first brake member by operation of said electromagnetic body.

24. The spring operated clutch of claim 23 wherein said output means comprises a housing surrounding said input means, said first and second brake members, said magnet body, and said annular armature means; and further wherein said magnet body is fixedly secured to said housing.

25. The spring operated clutch of claim 24 wherein said input means further comprises:
an input shaft;
an input sleeve fixedly interconnected with said input shaft for rotation therewith; and
a resilient double cone member fixedly interconnected with said input sleeve and extending radially therefrom, said first and second frustoconical surfaces being surfaces of said cone member.

26. The spring operated clutch of claim 25 wherein said magnet body is rotatably mounted to said input sleeve by means of a C-clip and further wherein said annular armature means is rotatably disposed about said input sleeve.

27. A spring operated clutch comprising:
input means;
a first frustoconical surface on said input means;
a second frustoconical surface on said input means, said second frustoconical surface being oppositely disposed with respect to said first frustoconical surface to form a convex apex therebetween;
friction brake means movably mounted to said input means, said friction brake means comprising a first brake member and a second brake member, said first brake member having a frictional surface that is engageable with one of said first frustoconcial surface on said input means and said second frustoconical surface on said input means, said second friction brake member having a frustoconical surface that is engageable with the other of said first frustoconcial surface on said input means and said second frustoconical surface on said input means, one of said first brake member and said second brake member being disposed within a bore of the other of said first brake member and said second brake member, said other of said first brake member and said second brake member further comprising:
splines extending from said bore and said one of said first brake member and said second brake member further comprising external splines cooperating with said first mentioned splines to reciprocably interconnect said first brake member and said second brake member; and first biasing means biasing said friction brake means into engagement with said input means to bias the frustoconical surface of said first brake member against said one of said first frustoconical surface on said input means and said second frustoconical surface on said input means and to bias the frustoconical surface on said second brake member against said other of said first frustoconical surface on said input means and said second frustoconical surface on said input means;

a first plurality of teeth extending from said friction brake means;

output means;

gear means movably interconnected to said output means such as to be selectively movable towards and away from said friction brake means;

a second plurality of teeth extending from said gear means towards said first plurality of teeth and selectively engageable therewith when said gear means is selectively moved towards said friction brake means;

second biasing means biasing said gear means towards said friction brake means and, thereby, biasing said teeth into engagement; and third biasing means selectively operable to bias said gear means away from said friction brake means, said third biasing means overcoming the force of said second biasing means when selectively operated.

28. A spring operated clutch comprising:

input means;

a first frustoconical surface on said input means;

a second frustoconical surface on said input means, said second frustoconical surface being disposed adjacent to and facing away from said first frustoconcial surface such that, together, said first and second frustoconical surfaces define a convex apex;

a generally annular first brake member having a partial bore therein adjacent to and coaxial with first frustoconical surface, said first brake member further being disposed about said input means;

a third frustoconical surface on said first brake member and adjacent said first frustoconical surface for engagement therewith;

a second brake member movably disposed in said partial bore and interconnected with said first brake member;

a fourth frustoconical surface on said second brake member and adjacent said second frustoconical surface of said input means for engagement therewith;

biasing means biasing said first and second brake members such as to bias said third and fourth frustoconical surfaces towards each other into engagement with said first and second frustoconical surfaces, respectively, said biasing means being movably disposed in said bore;

a first plurality of teeth extending from said first brake member;

output means;

an electromagnetic body rigidly rixedly interconnected with said output means and selectively operable to generate a magnetic field;

annular armature means movably interconnected with said electromagnetic body such as to be reciprocable relative thereto towards and away from said first brake member;

a second plurality of teeth extending from said annular armature means engageable with said first plurality of teeth; and second biasing means interposed said annular armature means and said electromagnetic body and biasing said annular armature means towards said first brake member, said annular armature means being selectively driveable against the force of said second biasing means away from said first brake member by operation of said electromagentic body.

29. The spring operated clutch of claim 28 further comprising an adjusting member movably interconnected with said first brake member to close said bore; said biasing means being disposed between said adjusting member and said second brake member; and said adjusting member being adjustable relative to said first brake member to adjust the torsional force exerted by said brake member on said input means.

* * * * *

UNITED STATES PATENT AND TRADEMARK OFFICE
CERTIFICATE OF CORRECTION

PATENT NO. : 4,606,444

DATED : August 19, 1986

Sheet 1 of 3

INVENTOR(S) : Thomas Curran Sekella

It is certified that error appears in the above-identified patent and that said Letters Patent is hereby corrected as shown below:

Column 1, line 62, delete "conponents" and insert ---- components ----.

Column 3, line 33, before "the" insert ---- but with ----.

Column 3, line 51, delete "coyer" and insert ---- cover ----.

Column 3, line 60, delete "subassenbly" and insert ---- subassembly ----.

Column 4, line 62, after "70" insert a period ---- . ----.

Column 4, line 63, delete "cyqindrical" and insert ---- cylindrical ----.

Column 5, line 18, delete a comma "," and insert a period ---- . ----.

UNITED STATES PATENT AND TRADEMARK OFFICE
CERTIFICATE OF CORRECTION

PATENT NO. : 4,606,444
DATED : August 19, 1986
INVENTOR(S) : Thomas Curran Sekella It is certified that error appears in the above-identified patent and that said Letters Patent is hereby corrected as shown below:

In the Claims

Column 7, line 23, delete "friction".

Column 8, line 50, delete "fricition" and insert ---- friction ----.

Column 9, line 56, delete "movable" and insert ---- movably ----.

Column 9, line 66, delete "respectively," and insert ---- respectively; ----.

Column 10, line 3, delete "outout" and insert ---- output ----.

Column 10, line 49, delete "frictional" and insert ---- frustoconical ----.

UNITED STATES PATENT AND TRADEMARK OFFICE
CERTIFICATE OF CORRECTION

PATENT NO. : 4,606,444

DATED : August 19, 1986

Sheet 3 of 3

INVENTOR(S) : Thomas Curran Sekella

It is certified that error appears in the above-identified patent and that said Letters Patent is hereby corrected as shown below:

Column 10, line 50, delete "frustoconcial" and insert ---- frusto-conical ----.

Column 10, line 55, delete "frustoconcial" and insert ---- frusto-conical ----.

Column 11, line 36, delete "concial" and insert ---- conical ----.

Column 12, line 20, delete "rixedly" and insert ---- fixedly ----.

Column 12, line 36, delete "electromagentic" and insert ---- electromagnetic ----.

In the Abstract

Line 23, after "of" insert ---- the ----.

Signed and Sealed this

Twenty-fourth Day of February, 1987

Attest:

DONALD J. QUIGG

Attesting Officer

Commissioner of Patents and Trademarks